United States Patent
Segall et al.

(10) Patent No.: US 9,700,066 B2
(45) Date of Patent: *Jul. 11, 2017

(54) PREPARATION OF SOY PROTEIN ISOLATE USING CALCIUM CHLORIDE EXTRACTION ("S703 CIP")

(75) Inventors: Kevin I. Segall, Winnipeg (CA); Martin Schweizer, Winnipeg (CA); Brent E. Green, Warren (CA); Sarah Medina, Winnipeg (CA); Brandy Gosnell, Winnipeg (CA)

(73) Assignee: BURCON NUTRASCIENCE (MB) Corp., Vancouver, BC.

(*) Notice: Subject to any disclaimer, the term of this patent is extended or adjusted under 35 U.S.C. 154(b) by 491 days.

This patent is subject to a terminal disclaimer.

(21) Appl. No.: 14/117,384

(22) PCT Filed: May 9, 2012

(86) PCT No.: PCT/CA2012/000443
§ 371 (c)(1),
(2), (4) Date: Jul. 29, 2015

(87) PCT Pub. No.: WO2012/155242
PCT Pub. Date: Nov. 22, 2012

(65) Prior Publication Data
US 2015/0366237 A1    Dec. 24, 2015

Related U.S. Application Data

(63) Continuation-in-part of application No. 13/067,201, filed on May 17, 2011, now Pat. No. 8,404,299, which is a continuation-in-part of application No. 12/828,212, filed on Aug. 6, 2013, now Pat. No. 8,501,265.

(60) Provisional application No. 61/213,647, filed on Jun. 30, 2009.

(51) Int. Cl.
*A23J 1/14*     (2006.01)
*A23L 2/66*     (2006.01)
*A23L 33/185*   (2016.01)

(52) U.S. Cl.
CPC . *A23J 1/14* (2013.01); *A23L 2/66* (2013.01); *A23L 33/185* (2016.08); *A23V 2002/00* (2013.01)

(58) Field of Classification Search
CPC ........................................................ A23J 3/16
See application file for complete search history.

(56) References Cited

U.S. PATENT DOCUMENTS

| | | | |
|---|---|---|---|
| 3,736,147 | A | 5/1973 | Lacobucci et al. |
| 4,169,090 | A | 9/1979 | Murray et al. |
| 4,208,323 | A | 6/1980 | Murray et al. |
| 4,296,026 | A | 10/1981 | Millar |
| 5,844,086 | A | 12/1998 | Murray et al. |
| 6,005,076 | A | 12/1999 | Murray et al. |
| 7,465,470 | B2 | 12/2008 | Saito et al. |
| 8,404,299 | B2 | 3/2013 | Segall et al. |
| 8,501,265 | B2 | 8/2013 | Segall et al. |
| 8,557,321 | B2 | 10/2013 | Segall et al. |

(Continued)

FOREIGN PATENT DOCUMENTS

| | | |
|---|---|---|
| CA | 1311877 | 12/1992 |
| CA | 2445147 | 11/2002 |

(Continued)

OTHER PUBLICATIONS

Friedman et al., "Nutritional and Health Benefits of Soy Proteins" in Journal of agricultural and Food Chemistry, Mar. 2001, vol. 49, No. 3, p. 1069-1086.*

(Continued)

*Primary Examiner* — Elizabeth Gwartney

(57) ABSTRACT

A soy protein product having a protein content of at least about 60 wt % (N×6.25) d.b., preferably an isolate having a protein content of at least about 90 wt % (N×6.25) d.b., is formed by a procedure in which soy protein is extracted from a soy source material using an aqueous calcium chloride solution at low pH, generally about 1.5 to about 5, and separating the resulting aqueous soy protein solution from residual soy protein source. The resulting clarified aqueous soy protein solution may be diluted and the pH adjusted within the range of 1.5-5.0. The solution may be concentrated by ultrafiltration, diafiltered and then dried to provide the soy protein product. Alternatively, the concentrated and optionally diafiltered soy protein solution may be optionally adjusted in pH within the range of 1.5-7.0 then diluted into water to cause the formation of a precipitate, separating the precipitate from the diluting water (supernatant) and drying the separated soy protein to form a soy protein product having a protein content of at least about 60 wt % (N×6.25) d.b., preferably a soy protein isolate having a protein content of at least about 90 wt % (N×6.25) d.b. The supernatant may be processed to form soy protein products having a protein content of at least about 60 wt % (N×6.25) d.b., preferably a soy protein isolate having a protein content of at least 90 wt % (N×6.25) d.b. Alternatively, the precipitate from the dilution step may be re-solubilized in the diluting water by adjustment of the pH to resolubilize the precipitate and form a protein solution. The soy protein solution may be concentrated while maintaining the ionic strength substantially constant by using a selective membrane technique followed by optional diafiltration and drying. The soy protein product is soluble in acidic medium and produces transparent, heat stable solutions and hence may be used for protein fortification of soft drinks and sports drinks.

94 Claims, No Drawings

(56) References Cited

U.S. PATENT DOCUMENTS

| | | | |
|---|---|---|---|
| 2005/0255226 A1* | 11/2005 | Schweizer | A23J 1/14 426/656 |
| 2010/0098818 A1 | 4/2010 | Schweizer et al. | |
| 2010/0189852 A1 | 7/2010 | Segall et al. | |
| 2010/0203204 A1 | 8/2010 | Segall et al. | |
| 2010/0330249 A1 | 12/2010 | Segall et al. | |
| 2010/0330250 A1 | 12/2010 | Segall et al. | |
| 2011/0038993 A1 | 2/2011 | Schweizer et al. | |
| 2011/0223295 A1 | 9/2011 | Segall et al. | |

FOREIGN PATENT DOCUMENTS

| | | |
|---|---|---|
| CA | 2564400 | 11/2005 |
| CA | 2741120 | 4/2010 |
| CA | 2751606 | 8/2010 |
| CA | 2766808 | 1/2011 |
| EP | 0752212 | 1/1997 |
| WO | 2005107492 | 11/2005 |
| WO | 2007033481 | 3/2007 |
| WO | 2010045727 | 4/2010 |
| WO | 2010083612 | 8/2010 |
| WO | 2010091509 | 8/2010 |
| WO | 2010091511 | 8/2010 |
| WO | 201100098 | 1/2011 |
| WO | 2011000096 | 1/2011 |
| WO | 2012155242 | 11/2012 |

OTHER PUBLICATIONS

Friedman et al., "Nutritional and Helath Benefits of Soy Proteins"—J. Agric. Food Chem., 2001, vol. 49, No. 3, pp. 1069-1079.*

* cited by examiner

PREPARATION OF SOY PROTEIN ISOLATE USING CALCIUM CHLORIDE EXTRACTION ("S703 CIP")

REFERENCE TO RELATED APPLICATION

This application is a U.S. National Phase filing under 35 USC 371 of PCT/CA2012/000443 filed May 9, 2012 claiming priority under 35 USC 119(a) from U.S. patent application Ser. No. 13/067,201 (now U.S. Pat. No. 8,404,299) filed May 17, 2011 which itself is a continuation-in-part of U.S. patent application Ser. No. 12/828,212 (now U.S. Pat. No. 8,501,265) filed Jun. 30, 2010 which itself claims priority under 35 USC 119(e) from U.S. Provisional Patent Application No. 61/213,647 filed Jun. 30, 2009.

FIELD OF INVENTION

The present invention is concerned with the preparation of soy protein products.

BACKGROUND TO THE INVENTION

In U.S. patent applications Ser. No. 12/603,087 (7865-415) filed Oct. 21, 2009 (US Patent Publication No. 2010-0098818) and Ser. No. 12/923,897 (7865-454) filed Oct. 13, 2010 (US Patent Publication No. 2011-0038993), assigned to the assignee hereof and the disclosures of which are incorporated herein by reference, there is described the preparation of a soy protein product, preferably a soy protein isolate, which is completely soluble and is capable of providing transparent and heat stable solutions at low pH values. This soy protein product may be used for protein fortification of, in particular, soft drinks and sports drinks, as well as other acidic aqueous systems, without precipitation of protein. The soy protein product is produced by extracting a soy protein source with aqueous calcium chloride solution at natural pH, optionally diluting the resulting aqueous soy protein solution, adjusting the pH of the aqueous soy protein solution to a pH of about 1.5 to about 4.4, preferably about 2.0 to about 4.0, to produce an acidified clear soy protein solution, which may be optionally concentrated and/or diafiltered before drying.

SUMMARY OF THE INVENTION

It has now been surprisingly found that a soy protein product having a protein content of at least about 60 wt % (N×6.25) d.b. may be formed by a procedure involving extraction of the soy protein source with calcium chloride at low pH values.

In one aspect of the present invention, a soy protein source material is extracted with aqueous calcium chloride solution at low pH and the resulting aqueous soy protein solution is optionally diluted, optionally adjusted in pH within the acidic range, then subjected to ultrafiltration and optional diafiltration to provide a concentrated and optionally diafiltered soy protein solution, which may be dried to provide the soy protein product.

In another aspect of the present invention, a soy protein source material is extracted with aqueous calcium chloride solution at low pH and the resulting aqueous soy protein solution is optionally diluted, optionally adjusted in pH within the acidic range, then subjected to ultrafiltration and optional diafiltration to provide a concentrated and optionally diafiltered soy protein solution. The concentrated and optionally diafiltered soy protein solution may then be optionally adjusted in pH within the pH range of about 1.5 to about 7, preferably about 4 to about 7, more preferably about 5 to about 7 and diluted with water to fractionate the soy proteins into a precipitate rich in globulins and a supernatant rich in albumin proteins and containing trypsin inhibitors. Precipitate formed by the dilution step may be collected and further processed or dried as is to provide the soy protein product, but with a reduced level of trypsin inhibitors.

In another aspect of the present invention, the concentrated and optionally diafiltered and optionally pH adjusted soy protein solution, prepared as described above is diluted into water. The pH of the diluted sample is adjusted to about 1.5 to about 4.4, preferably about 2.0 to about 4.0 to re-solubilize protein precipitated by the dilution step. The diluted and pH adjusted solution may then be optionally heat treated and/or concentrated and/or diafiltered.

The soy protein products provided herein, having a protein content of at least about 60 wt % (N×6.25) d.b., are soluble at acid pH values to provide transparent and heat stable aqueous solutions thereof. The soy protein products may be used for protein fortification of, in particular, soft drinks and sports drinks, as well as other aqueous systems without precipitation of protein. The soy protein product is preferably an isolate having a protein content of at least about 90 wt %, preferably at least about 100 wt % (N×6.25) d.b.

In accordance with one aspect of the present invention, there is provided a method of producing a soy protein product having a soy protein content of at least about 60 wt % (N×6.25), on a dry weight basis, which comprises:
  (a) extracting a soy protein source with aqueous calcium salt solution, generally calcium chloride solution, at low pH, generally about 1.5 to about 5.0, to cause solubilization of soy protein from the protein source and to form an aqueous soy protein solution,
  (b) at least partially separating the aqueous soy protein solution from residual soy protein source,
  (c) optionally diluting the aqueous soy protein solution,
  (d) optionally adjusting the pH of the aqueous protein solution to a value within the range of about 1.5 to about 5.0, preferably about 1.5 to about 4.4, more preferably about 2.0 to about 4.0, and differing from the pH of extraction,
  (e) optionally polishing the aqueous soy protein solution to remove residual particulates,
  (f) optionally concentrating the aqueous soy protein solution while maintaining the ionic strength substantially constant by using a selective membrane technique,
  (g) optionally diafiltering the concentrated soy protein solution, and
  (h) optionally drying the concentrated and diafiltered soy protein solution.

The soy protein product preferably is an isolate having a protein content of at least about 90 wt %, preferably at least about 100 wt % (N×6.25) d.b.

A variation of this procedure may be adopted to produce the product with a reduced content of albumin proteins and trypsin inhibitors. In such a variation, the concentrated and optionally diafiltered soy protein solution is optionally adjusted in pH within the range of about 1.5 to about 7.0, preferably about 4.0 to about 7.0, more preferably about 5.0 to about 7.0, then diluted into water to yield a precipitate with a reduced content of albumin proteins and trypsin inhibitors. The precipitate may be collected and dried to yield the product or the precipitate may be solubilized in water at pH about 1.5 to about 4.4, preferably about 2.0 to about 4.0 and then dried. Alternatively, the solution formed by solubilizing the precipitate in water at pH about 1.5 to about 4.4, preferably about 2.0 to about 4.0 may be optionally heat treated and/or polished and/or concentrated and/or diafiltered before drying.

Accordingly, in another aspect of the present invention, there is described a method of producing a soy protein product having a soy protein content of at least about 60 wt % (N×6.25), dry weight basis, which comprises:
- (a) extracting a soy protein source with aqueous calcium salt solution, generally calcium chloride solution, at low pH, generally about 1.5 to about 5.0, to cause solubilization of soy protein from the protein source and to form an aqueous soy protein solution,
- (b) at least partially separating the aqueous soy protein solution from residual soy protein source,
- (c) optionally diluting the aqueous soy protein solution,
- (d) optionally adjusting the pH of the aqueous protein solution to a value within the range of about 1.5 to about 5.0, preferably about 1.5 to about 4.4, more preferably about 2.0 to about 4.0, and differing from the pH of extraction,
- (e) optionally polishing the aqueous soy protein solution to remove residual particulates,
- (f) concentrating the aqueous soy protein solution while maintaining the ionic strength substantially constant by using a selective membrane technique,
- (g) optionally diafiltering the concentrated soy protein solution,
- (h) optionally adjusting the pH of the concentrated and optionally diafiltered soy protein solution to a value within the range of about 1.5 to about 7.0, preferably about 4.0 to about 7.0, more preferably about 5.0 to about 7.0,
- (i) diluting the concentrated and optionally diafiltered and pH adjusted soy protein solution into water,
- (j) separating precipitate formed from the diluting water, termed the supernatant, and
- (k) drying the separated soy protein precipitate.

The soy protein product preferably is an isolate having a protein content of at least about 90 wt %, preferably at least about 100 wt % (N×6.25) d.b.

Another variation of this procedure may be adopted to produce the product. In such a variation, the concentrated and optionally diafiltered and optionally pH adjusted soy protein solution is diluted into water and the pH adjusted after dilution, which re-solubilizes precipitate formed by the dilution step. The resulting pH adjusted solution is optionally heat treated and/or polished and/or concentrated and/or diafiltered before drying to yield the product.

Accordingly, in a further aspect of the present invention, there is described a method of producing a soy protein product having a soy protein content of at least about 60 wt % (N×6.25), dry weight basis, which comprises:
- (a) extracting a soy protein source with aqueous calcium salt solution, generally calcium chloride solution, at low pH, generally about 1.5 to about 5.0, to cause solubilization of soy protein from the protein source and to form an aqueous soy protein solution,
- (b) at least partially separating the aqueous soy protein solution from residual soy protein source,
- (c) optionally diluting the aqueous soy protein solution,
- (d) optionally adjusting the pH of the aqueous protein solution to a value within the range of about 1.5 to about 5.0, preferably about 1.5 to about 4.4, more preferably about 2.0 to about 4.0, and differing from the pH of extraction,
- (e) optionally polishing the aqueous soy protein solution to remove residual particulates,
- (f) concentrating the aqueous soy protein solution while maintaining the ionic strength substantially constant by using a selective membrane technique,
- (g) optionally diafiltering the concentrated soy protein solution,
- (h) optionally adjusting the pH of the concentrated and optionally diafiltered soy protein solution to a value within the range of about 1.5 to about 7.0, preferably about 4.0 to about 7.0, more preferably about 5.0 to about 7.0,
- (i) diluting the concentrated and optionally diafiltered and pH adjusted soy protein solution into water,
- (j) adjusting the pH of the diluted sample to a value within the range of about 1.5 to about 4.4, preferably about 2.0 to about 4.0 to re-solubilize protein precipitate formed by the dilution step,
- (k) optionally concentrating the pH adjusted soy protein solution while maintaining the ionic strength substantially constant by using a selective membrane technique,
- (l) optionally diafiltering the concentrated, pH adjusted soy protein solution, and
- (m) drying the concentrated and optionally diafiltered, pH adjusted soy protein solution.

The soy protein product preferably is an isolate having a protein content of at least about 90 wt %, preferably at least about 100 wt % (N×6.25) d.b.

Although this specification refers mainly to the production of a soy protein isolate, the concentration and/or diafiltration steps described herein may be manipulated to produce a soy protein product of lesser purity, for example, a soy protein concentrate having a protein content of at least about 60 wt %, but which has substantially similar properties to the isolate.

The novel soy protein products of the invention can be blended with powdered drinks for the formation of aqueous soft drinks or sports drinks by dissolving the same in water. Such blend may be a powdered beverage.

The soy protein products provided herein may be provided as an aqueous solution thereof having a high degree of clarity at acid pH values and which is heat stable at these pH values.

In another aspect of the present invention, there is provided an aqueous solution of the soy product provided herein which is heat stable at low pH. The aqueous solution may be a beverage, which may be a clear beverage in which the soy protein product is completely soluble and transparent or an opaque beverage in which the soy protein product does not increase the opacity. The soy protein product also has good solubility at about pH 7. An aqueous solution of the soy protein product, prepared at a near neutral pH, such as a pH of about 6 to about 8, may be a beverage.

The soy protein products produced according to the process herein lack the characteristic beany flavour of soy protein isolates and are suitable, not only for protein fortification of acidic media, but may be used in a wide variety of conventional applications of protein isolates, including but not limited to protein fortification of processed foods and beverages, emulsification of oils, as a body former in baked goods and foaming agent in products which entrap gases. In addition, the soy protein product may be formed into protein fibers, useful in meat analogs, and may be used as an egg white substitute or extender in food products where egg white is used as a binder. The soy protein product may also be used in nutritional supplements. Other uses of the soy protein product are in pet foods, animal feed and in industrial and cosmetic applications and in personal care products.

GENERAL DESCRIPTION OF INVENTION

The initial step of the process of providing the soy protein product involves solubilizing soy protein from a soy protein source. The soy protein source may be soybeans or any soy product or by-product derived from the processing of soybeans including but not limited to soy meal, soy flakes, soy grits and soy flour. The soy protein source may be used in the full fat form, partially defatted form or fully defatted form. Where the soy protein source contains an appreciable amount of fat, an oil-removal step generally is required during the process. The soy protein recovered from the soy protein source may be the protein naturally occurring in soybean or the proteinaceous material may be a protein modified by genetic manipulation but possessing characteristic hydrophobic and polar properties of the natural protein.

Protein solubilization from the soy protein source material is effected most conveniently using calcium chloride solution, although solutions of other calcium salts may be used. In addition, other alkaline earth metal compounds may be used, such as magnesium salts. Further, extraction of the soy protein from the soy protein source may be effected using calcium salt solution in combination with another salt solution such as sodium chloride. Additionally, extraction of the soy protein from the soy protein source may be effected using water or other salt solution, such as sodium chloride, with calcium chloride subsequently being added to the aqueous soy protein solution produced in the extraction step. Precipitate formed upon addition of the calcium chloride then is removed prior to subsequent processing.

As the concentration of the calcium salt solution increases, the degree of solubilization of protein from the soy protein source initially increases until a maximum value is achieved. Any subsequent increase in salt concentration does not increase the total protein solubilized. The concentration of calcium salt solution which causes maximum protein solubilization varies depending on the salt concerned. It is usually preferred to utilize a concentration value less than about 1.0 M, and, more preferably, a value of about 0.10 M to about 0.15 M.

In a batch process, the solubilization of the protein is effected at a temperature of from about 1° C. to about 100° C., preferably about 15° to about 65° C., more preferably about 20° C. to about 35° C., preferably accompanied by agitation to decrease the solubilization time, which is usually about 1 to about 60 minutes. It is preferred to effect the solubilization to extract substantially as much protein from the soy protein source as is practicable, so as to provide an overall high product yield.

In a continuous process, the extraction of the soy protein from the soy protein source is carried out in any manner consistent with effecting a continuous extraction of soy protein from the soy protein source. In one embodiment, the soy protein source is continuously mixed with calcium salt solution and the mixture is conveyed through a pipe or conduit having a length and at a flow rate for a residence time sufficient to effect the desired extraction in accordance with the parameters described herein. In such a continuous procedure, the solubilization step is effected rapidly, in a time of up to about 10 minutes, preferably to effect solubilization to extract substantially as much protein from the soy protein source as is practicable. The solubilization in the continuous procedure is effected at temperatures between about 1° C. and about 100° C., preferably about 15° C. to about 65° C., more preferably between about 20° C. and about 35° C.

The extraction is generally conducted at a pH of about 1.5 to about 5.0. The pH of the extraction system (soy protein source and calcium salt solution) may be adjusted to any desired value within the range of about 1.5 to about 5.0 for the extraction step by the use of any convenient food grade acid, usually hydrochloric acid or phosphoric acid.

The concentration of soy protein source in the calcium salt solution during the solubilization step may vary widely. Typical concentration values are about 5 to about 15% w/v.

The protein extraction step with the aqueous calcium salt solution has the additional effect of solubilizing fats which may be present in the soy protein source, which then results in the fats being present in the aqueous phase.

The protein solution resulting from the extraction step generally has a protein concentration of about 5 to about 50 g/L, preferably about 10 to about 50 g/L.

The aqueous calcium salt solution may contain an antioxidant. The antioxidant may be any convenient antioxidant, such as sodium sulfite or ascorbic acid. The quantity of antioxidant employed may vary from about 0.01 to about 1 wt % of the solution, preferably about 0.05 wt %. The antioxidant serves to inhibit the oxidation of any phenolics in the protein solution.

The aqueous phase resulting from the extraction step then may be separated from the residual soy protein source, in any convenient manner, such as by employing a decanter centrifuge or any suitable sieve, followed by disc centrifugation and/or filtration, to remove residual soy protein source material. The separated residual soy protein source may be dried for disposal. Alternatively, the separated residual soy protein source may be processed to recover some residual protein. The separated residual soy protein source may be re-extracted with fresh calcium salt solution, with the re-extraction conducted in the pH range of about 1.5 to about 5.0, and the protein solution yielded upon clarification combined with the initial protein solution for further processing as described below. Alternatively, the separated residual soy protein source may be processed by a conventional isoelectric precipitation procedure or any other convenient procedure to recover such residual protein.

Where the soy protein source contains significant quantities of fat, as described in U.S. Pat. Nos. 5,844,086 and 6,005,076, assigned to the assignee hereof and the disclosures of which are incorporated herein by reference, then the defatting steps described therein may be effected on the separated aqueous protein. Alternatively, defatting of the separated aqueous protein solution may be achieved by any other convenient procedure.

The aqueous soy protein solution may be treated with an adsorbent, such as powdered activated carbon or granulated activated carbon, to remove colour and/or odour compounds. Such adsorbent treatment may be carried out under any convenient conditions, generally at the ambient temperature of the separated aqueous protein solution. For powdered activated carbon, an amount of about 0.025% to about 5% w/v, preferably about 0.05% to about 2% w/v, is employed. The adsorbing agent may be removed from the soy protein solution by any convenient means, such as by filtration.

The resulting aqueous soy protein solution may be diluted generally with about 0.5 to about 10 volumes, preferably about 0.5 to about 2 volumes of aqueous diluent, in order to decrease the conductivity of the aqueous soy protein solution to a value of generally below about 90 mS, preferably about 4 to about 31 mS. Such dilution is usually effected using water, although dilute salt solution, such as sodium chloride or calcium chloride, having a conductivity of up to about 3 mS, may be used.

The diluent with which the soy protein solution is mixed may have a temperature of about 2° to about 70° C., preferably about 15° to about 65° C., more preferably about 20° to about 35° C.

The optionally diluted soy protein solution may be adjusted in pH to a value different from the extraction pH but still within the range of about 1.5 to about 5.0, preferably about 1.5 to about 4.4, more preferably about 2.0 to about 4.0, by the addition of any suitable food grade acid, such as hydrochloric acid or phosphoric acid, or food grade alkali, usually sodium hydroxide as required.

The diluted and optionally pH adjusted soy protein solution has a conductivity of generally below about 95 mS, preferably about 4 to about 36 mS.

The aqueous soy protein solution may be subjected to a heat treatment to inactivate heat labile anti-nutritional factors, such as trypsin inhibitors, present in such solution as a result of extraction from the soy protein source material during the extraction step. Such a heating step also provides the additional benefit of reducing the microbial load. Generally, the protein solution is heated to a temperature of about 70° to about 160° C., preferably about 80° to about 120° C., more preferably about 85° C. to about 95° C. for about 10 seconds to about 60 minutes, preferably about 30 seconds to about 5 minutes. The heat treated soy protein solution then may be cooled for further processing as described below, to a temperature of about 2° C. to about 65° C., preferably about 20° to about 35° C.

The optionally diluted, optionally pH adjusted and optionally heat treated protein solution may optionally be polished by any convenient means, such as by filtering to remove any residual particulates.

The resulting aqueous soy protein solution may be directly dried to produce a soy protein product. In order to provide a soy protein product having a decreased impurities content and a reduced salt content, such as a soy protein isolate, the aqueous soy protein solution may be processed prior to drying.

The aqueous soy protein solution may be concentrated to increase the protein concentration thereof while maintaining the ionic strength thereof substantially constant. Such concentration generally is effected to provide a concentrated soy protein solution having a protein concentration of about 50 to about 300 g/L, preferably about 100 to about 200 g/L.

The concentration step may be effected in any convenient manner consistent with batch or continuous operation, such as by employing any convenient selective membrane technique, such as ultrafiltration or diafiltration, using membranes, such as hollow-fibre membranes or spiral-wound membranes, with a suitable molecular weight cut-off, such as about 3,000 to about 1,000,000 Daltons, preferably about 5,000 to about 100,000 Daltons, having regard to differing membrane materials and configurations, and, for continuous operation, dimensioned to permit the desired degree of concentration as the aqueous protein solution passes through the membranes.

As is well known, ultrafiltration and similar selective membrane techniques permit low molecular weight species to pass therethrough while preventing higher molecular weight species from so doing. The low molecular weight species include not only the ionic species of the food grade salt but also low molecular weight materials extracted from the source material, such as carbohydrates, pigments, low molecular weight proteins and anti-nutritional factors, such as trypsin inhibitor, which themselves are low molecular weight proteins. The molecular weight cut-off of the membrane is usually chosen to ensure retention of a significant proportion of the protein in the solution, while permitting contaminants to pass through having regard to the different membrane materials and configurations.

The concentrated soy protein solution then may be subjected to a diafiltration step using water or a dilute saline solution. The diafiltration solution may be at its natural pH or at a pH equal to that of the protein solution being diafiltered or at any pH value in between. Such diafiltration may be effected using from about 2 to about 40 volumes of diafiltration solution, preferably about 5 to about 25 volumes of diafiltration solution. In the diafiltration operation, further quantities of contaminants are removed from the aqueous soy protein solution by passage through the membrane with the permeate. This purifies the aqueous protein solution and may also reduce its viscosity. The diafiltration operation may be effected until no significant further quantities of contaminants or visible colour are present in the permeate or until the retentate has been sufficiently purified so as, when dried, to provide a soy protein isolate with a protein content of at least about 90 wt % (N×6.25) d.b. Such diafiltration may be effected using the same membrane as for the concentration step. However, if desired, the diafiltration step may be effected using a separate membrane with a different molecular weight cut-off, such as a membrane having a molecular weight cut-off in the range of about 3,000 to about 1,000,000 Daltons, preferably about 5,000 to about 100,000 Daltons, having regard to different membrane materials and configuration.

Alternatively, the diafiltration step may be applied to the aqueous protein solution prior to concentration or to the partially concentrated aqueous protein solution. Diafiltration may also be applied at multiple points during the concentration process. When diafiltration is applied prior to concentration or to the partially concentrated solution, the resulting diafiltered solution may then be additionally concentrated. The viscosity reduction achieved by diafiltering multiple times as the protein solution is concentrated may allow a higher final, fully concentrated protein concentration to be achieved. This reduces the volume of material to be dried.

The concentration step and the diafiltration step may be effected herein in such a manner that the soy protein product subsequently recovered contains less than about 90 wt % protein (N×6.25) d.b., such as at least about 60 wt % protein (N×6.25) d.b. By partially concentrating and/or partially diafiltering the aqueous soy protein solution, it is possible to only partially remove contaminants. This protein solution may then be dried to provide a soy protein product with lower levels of purity. The soy protein product is still able to produce clear protein solutions under acidic conditions.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit the oxidation of any phenolics present in the concentrated soy protein solution.

The concentration step and the optional diafiltration step may be effected at any convenient temperature, generally about 2° C. to about 65° C., preferably about 20° C. to about 35° C., and for the period of time to effect the desired degree of concentration and diafiltration. The temperature and other conditions used to some degree depend upon the membrane equipment used to effect the membrane processing, the desired protein concentration of the solution and the efficiency of the removal of contaminants to the permeate.

There are two main trypsin inhibitors in soy, namely the Kunitz inhibitor, which is a heat-labile molecule with a molecular weight of approximately 21,000 Daltons, and the Bowman-Birk inhibitor, a more heat-stable molecule with a molecular weight of about 8,000 Daltons. The level of trypsin inhibitor activity in the final soy protein product can be controlled by manipulation of various process variables.

As noted above, heat treatment of the aqueous soy protein solution may be used to inactivate heat-labile trypsin inhibitors. The partially concentrated or fully concentrated soy protein solution may also be heat treated to inactivate heat labile trypsin inhibitors. When the heat treatment is applied to the partially concentrated soy protein solution, the resulting heat treated solution may then be additionally concentrated.

In addition, the concentration and/or diafiltration steps may be operated in a manner favorable for removal of trypsin inhibitors in the permeate along with the other contaminants. Removal of the trypsin inhibitors is promoted by using a membrane of larger pore size (such as about 30,000 to about 1,000,000 Da), operating the membrane at elevated temperatures (such as about 30° C. to about 65° C.) and employing greater volumes of diafiltration medium (such as about 20 to about 40 volumes).

Extracting and/or membrane processing the protein solution at a lower pH (1.5-3.0) may reduce the trypsin inhibitor activity relative to processing the solution at higher pH (3.0-5.0). When the protein solution is concentrated and diafiltered at the low end of the pH range, it may be desired to raise the pH of the retentate prior to drying. The pH of the concentrated and diafiltered protein solution may be raised to the desired value, for example pH 3, by the addition of any convenient food grade alkali such as sodium hydroxide. If it is desired to lower the pH of the retentate prior to drying, this may be done so by the addition of any convenient food grade acid such as hydrochloric acid or phosphoric acid.

Further, a reduction in trypsin inhibitor activity may be achieved by exposing soy materials to reducing agents that disrupt or rearrange the disulfide bonds of the inhibitors. Suitable reducing agents include sodium sulfite, cysteine and N-acetylcysteine.

The addition of such reducing agents may be effected at various stages of the overall process. The reducing agent may be added with the soy protein source material in the extraction step, may be added to the clarified aqueous soy protein solution following removal of residual soy protein source material, may be added to the concentrated protein solution before or after diafiltration or may be dry blended with the dried soy protein product. The addition of the reducing agent may be combined with a heat treatment step and the membrane processing steps, as described above.

If it is desired to retain active trypsin inhibitors in the concentrated protein solution, this can be achieved by eliminating or reducing the intensity of the heat treatment step, not utilizing reducing agents, operating the concentration and diafiltration steps at the higher end of the pH range (3.0 to 5.0), utilizing a concentration and diafiltration membrane with a smaller pore size, operating the membrane at lower temperatures and employing fewer volumes of diafiltration medium.

The concentrated and optionally diafiltered protein solution may be subject to a further defatting operation, if required, as described in U.S. Pat. Nos. 5,844,086 and 6,005,076. Alternatively, defatting of the concentrated and optionally diafiltered protein solution may be achieved by any other convenient procedure.

The concentrated and optionally diafiltered aqueous protein solution may be treated with an adsorbent, such as powdered activated carbon or granulated activated carbon, to remove colour and/or odour compounds. Such adsorbent treatment may be carried out under any convenient conditions, generally at the ambient temperature of the concentrated protein solution. For powdered activated carbon, an amount of about 0.025% to about 5% w/v, preferably about 0.05% to about 2% w/v, is employed. The adsorbent may be removed from the soy protein solution by any convenient means, such as by filtration.

The concentrated and optionally diafiltered soy protein solution resulting from the optional defatting and optional adsorbent treatment step may be subjected to a pasteurization step to reduce the microbial load. Such pasteurization may be effected under any desired pasteurization conditions. Generally, the concentrated and optionally diafiltered soy protein solution is heated to a temperature of about 55° to about 70° C., preferably about 60° to about 65° C., for about 30 seconds to about 60 minutes, preferably about 10 minutes to about 15 minutes. The pasteurized concentrated and diafiltered soy protein solution then may be cooled for drying or further processing, preferably to a temperature of about 20° to about 35° C.

In accordance with one aspect of the current invention, the concentrated and optionally diafiltered soy protein solution may be dried by any convenient technique, such as spray drying or freeze drying, to yield the soy protein product. The dry soy protein product has a protein content in excess of about 60 wt % (N×6.25) d.b. Preferably, the dry soy protein product is an isolate with a high protein content, in excess of about 90 wt % protein, preferably at least about 100 wt % (N×6.25) d.b.

In another aspect of the invention, the concentrated protein solution resulting from the concentration step and optional diafiltration step, optional defatting step, optional adsorbent treatment step and optional pasteurization step, is optionally adjusted in pH within the range of about 1.5 to about 7.0, preferably to about 4.0 to about 7.0, more preferably to about 5.0 to about 7.0 and then diluted by mixing the concentrated protein solution with water having the volume required to achieve the degree of dilution desired. When the intent is to separate precipitated protein from the residual aqueous phase, termed the supernatant, as is the case for this aspect of the current invention, the degree of dilution is generally about 5 fold to about 25 fold, preferably about 10 fold to about 20 fold. The water with which the concentrated protein solution is mixed preferably has a temperature of about 1° to about 65° C., preferably about 20° to about 35° C.

In a batch operation, the batch of concentrated protein solution is added to a static body of water having the desired volume, as discussed above. Dilution of the concentrated protein solution decreases the ionic strength and causes the formation of the protein precipitate. In the batch procedure, the protein precipitate is allowed to settle in the body of water. The settling may be assisted, such as by centrifugation. Such induced settling decreases the moisture content and the occluded salt content of the precipitated protein.

Alternatively, the dilution operation may be carried out continuously by continuously passing the concentrated protein solution to one inlet of a T-shaped pipe, while the diluting water is fed to the other inlet of the T-shaped pipe, permitting mixing in the pipe. The diluting water is fed into the T-shaped pipe at a rate sufficient to achieve the desired degree of dilution of the concentrated protein solution.

The mixing of the concentrated protein solution and the diluting water in the pipe initiates the formation of protein precipitate and the mixture is continuously fed from the outlet of the T-shaped pipe into a settling vessel, from which, when full, supernatant is permitted to overflow. The mixture preferably is fed into the body of liquid in the settling vessel in a manner which minimizes turbulence within the body of liquid.

In the continuous procedure, the protein precipitate is allowed to settle in the settling vessel and the procedure is continued until a desired quantity of the precipitate has accumulated in the bottom of the settling vessel, whereupon the accumulated precipitate is removed from the settling vessel. In lieu of settling by sedimentation, the precipitate may be separated continuously by centrifugation.

By the utilization of a continuous process for the recovery of soy protein precipitate as compared to the batch process, the initial protein extraction step can be significantly reduced in time for the same level of protein extraction. In addition, in a continuous operation, there is less chance of contamination than in a batch procedure, leading to higher product quality and the process can be carried out in more compact equipment.

Settled precipitate is separated from the residual aqueous phase or supernatant, such as by decantation of the residual aqueous phase from the settled mass or by centrifugation. The precipitate may be washed to remove residual supernatant, such as with about 1 to about 10, preferably about 2 to about 3 volumes of water and then the precipitate recovered again, as above. The optionally washed precipitate may be used in the wet form or may be dried, by any convenient technique, such as spray drying or freeze drying, to a dry form. The dry precipitate has a high protein content, in excess of about 60 wt % protein, preferably at least about 90 wt % protein (N×6.25), and more preferably at least about 100 wt % (N×6.25).

The supernatant arising from the dilution step may be dried to provide a soy protein product. Alternatively, the supernatant may be processed to decrease the impurity content thereof and/or the trypsin inhibitor activity thereof, by any convenient means such as pH adjustment and/or heat treatment and/or membrane processing. The processed supernatant may then be dried to provide a soy protein product.

As mentioned above, settled protein precipitate formed in the dilution step may be directly dried to yield the protein product. Alternatively, the wet protein precipitate may be re-suspended in water, such as about 2 to about 3 volumes, and re-solubilized by adjusting the pH of the sample to about 1.5 to about 4.4, preferably about 2.0 to about 4.0, using any convenient acid, such as hydrochloric acid or phosphoric acid. The re-solubilized protein solution then may be dried by any convenient technique, such as spray drying or freeze drying to a dry form. The dry protein product has a protein content in excess of about 60 wt % protein, preferably at least about 90 wt % protein, more preferably at least about 100 wt % protein (N×6.25).

As a further alternative, the re-solubilized soy protein solution may be subjected to a heat treatment to inactivate any remaining heat labile anti-nutritional factors. Such a heating step also provides the additional benefit of reducing the microbial load. Generally, the protein solution is heated to a temperature of about 70° to about 160° C., preferably about 80° to about 120° C., more preferably about 85° to about 95° C., for about 10 seconds to about 60 minutes, preferably about 30 seconds to about 5 minutes. The heat treated soy protein solution then may be cooled for further processing as described below, to a temperature of about 2° to about 65° C., preferably about 20° to about 35° C.

The re-solubilized and optionally heat treated protein solution may optionally be polished by any convenient means, such as by filtering, to remove any residual particulates.

The re-solubilized, optionally heat treated, optionally polished clear protein solution, may be concentrated to increase the protein concentration thereof. Such concentration is effected using any convenient selective membrane technique, such as ultrafiltration or diafiltration, using membranes with a suitable molecular weight cut-off permitting low molecular weight species, including salt, carbohydrates, pigments, trypsin inhibitors and other low molecular weight materials extracted from the protein source material, to pass through the membrane, while retaining a significant proportion of the soy protein in the solution. Ultrafiltration membranes having a molecular weight cut-off of about 3,000 to 1,000,000 Daltons, preferably about 5,000 to about 100,000 Daltons, having regard to differing membrane materials and configuration, may be used. Concentration of the protein solution in this way also reduces the volume of liquid required to be dried to recover the protein. The protein solution generally is concentrated to a protein concentration of about 50 g/L to about 300 g/L, preferably about 100 to about 200 g/L, prior to drying. Such concentration operation may be carried out in a batch mode or in a continuous operation, as described above.

The soy protein solution may be subjected to a diafiltration step before or after complete concentration using water. The water may be at its natural pH or at a pH equal to that of the protein solution being diafiltered or at any pH value in between. Such diafiltration may be effected using from about 2 to about 40 volumes of diafiltration solution, preferably about 5 to about 25 volumes of diafiltration solution. In the diafiltration operation, further quantities of contaminants are removed from the clear aqueous soy protein solution by passage through the membrane with the permeate. The diafiltration operation may be effected until no significant further quantities of contaminants or visible colour are present in the permeate or until the retentate has been sufficiently purified so as, when dried, to provide a soy protein product with the desired protein content, preferably an isolate with a protein content of at least about 90 wt % (N×6.25) d.b. Such diafiltration may be effected using the same membrane as for the concentration step. However, if desired, the diafiltration step may be effected using a separate membrane with a different molecular weight cut-off, such as a membrane having a molecular weight cut-off in the range of about 3,000 to about 1,000,000 Daltons, preferably about 5,000 to about 100,000 Daltons, having regard to different membrane materials and configuration.

The concentration step and the diafiltration step may be effected herein in such a manner that the soy protein product subsequently recovered by drying the concentrated and diafiltered retentate contains less than about 90 wt % protein (N×6.25) d.b., such as at least about 60 wt % protein (N×6.25) d.b. By partially concentrating and/or partially diafiltering the aqueous soy protein solution, it is possible to only partially remove contaminants. This protein solution may then be dried to provide a soy protein product with lower levels of purity. The soy protein product is still able to produce clear protein solutions under acidic conditions.

An antioxidant may be present in the diafiltration medium during at least part of the diafiltration step. The antioxidant may be any convenient antioxidant, such as sodium sulfite or ascorbic acid. The quantity of antioxidant employed in the diafiltration medium depends on the materials employed and may vary from about 0.01 to about 1 wt %, preferably about 0.05 wt %. The antioxidant serves to inhibit the oxidation of any phenolics present in the concentrated soy protein solution.

The optional concentration step and the optional diafiltration step may be effected at any convenient temperature, generally about 2° to about 65° C., preferably about 20° to about 35° C., and for the period of time to effect the desired degree of concentration and diafiltration. The temperature and other conditions used to some degree depend upon the membrane equipment used to effect the membrane processing, the desired protein concentration of the solution and the efficiency of the removal of contaminants to the permeate.

As previously noted, heat treatment of the re-solubilized aqueous soy protein solution may be used to inactivate remaining heat-labile trypsin inhibitors. Partially concentrated or fully concentrated re-solubilized soy protein solution may also be heat treated to inactivate heat labile trypsin inhibitors.

In addition, the concentration and/or diafiltration steps may be operated in a manner favorable for removal of trypsin inhibitors in the permeate along with the other contaminants. Removal of the trypsin inhibitors is promoted by using a membrane of larger pore size, such as 30,000 to 1,000,000 Daltons, operating the membrane at elevated temperatures, such as 30° to 65° C. and employing greater volumes of diafiltration medium, such as 20 to 40 volumes.

Membrane processing the protein solution at a lower pH (1.5 to 3) may reduce the trypsin inhibitor activity relative to processing the solution at higher pH (3 to 4.4). When the protein solution is concentrated and diafiltered at the low end of the pH range, it may be desired to raise the pH of the retentate prior to drying. The pH of the concentrated and diafiltered protein solution may be raised to the desired value, for example pH 3, by the addition of any convenient food grade alkali such as sodium hydroxide.

Further, a reduction in trypsin inhibitor activity may be achieved by exposing soy materials to reducing agents that disrupt or rearrange the disulfide bonds of the inhibitors. Suitable reducing agents include sodium sulfite, cysteine and N-acetylcysteine.

The addition of such reducing agents may be effected at various stages of the overall process. The reducing agent may be added to the wet protein precipitate resulting from the dilution step, may be added to the protein solution formed by re-solubilizing the precipitate, may be added to the concentrated solution before or after diafiltration or may be dry blended with the dried soy protein product. The addition of the reducing agent may be combined with a heat treatment step and the membrane processing steps, as described above.

If it is desired to retain remaining active trypsin inhibitors in the concentrated protein solution, this can be achieved by eliminating or reducing the intensity of the heat treatment step, not utilizing reducing agents, operating the concentration and diafiltration steps at the higher end of the pH range (3 to 4.4), utilizing a concentration and diafiltration membrane with a smaller pore size, operating the membrane at lower temperatures and employing fewer volumes of diafiltration medium.

The re-solubilized, optionally concentrated and optionally diafiltered aqueous protein solution may be treated with an adsorbent, such as powdered activated carbon or granulated activated carbon, to remove colour and/or odour compounds. Such adsorbent treatment may be carried out under any convenient conditions, generally at the ambient temperature of the protein solution. For powdered activated carbon, an amount of about 0.025% to about 5% w/v, preferably about 0.05% to about 2% w/v, is employed. The adsorbent may be removed from the soy protein solution by any convenient means, such as by filtration.

The re-solubilized, optionally concentrated and optionally diafiltered aqueous soy protein solution then may be dried by any convenient technique, such as spray drying or freeze drying. The dry soy protein product has a protein content of at least about 60 wt % (N×6.25) d.b., preferably in excess of about 90 wt % (N×6.25) d.b., more preferably at least about 100 wt % (N×6.25) d.b.

In accordance with another aspect of the current invention, the mixture of concentrated protein solution and dilution water may be processed without a fractionation step. In such a case, the degree of dilution is generally about 1 to 25 fold, preferably about 3 to about 12 fold. The water with which the concentrated protein solution is mixed has a temperature of about 1° to about 65° C., preferably about 20° C. to about 35° C.

The dilution water, containing the deposited protein precipitate, is adjusted in pH to about 1.5 to about 4.4, preferably about 2.0 to about 4.0, using any convenient acid, such as hydrochloric acid or phosphoric acid. The adjustment in pH causes the resolubilization of protein deposited by dilution. The protein solution may be used in the wet form or may be dried, by any convenient technique, such as spray drying or freeze drying, to a dry form.

As a further alternative, the protein solution formed by pH adjusting the mixture of protein precipitate and supernatant may be processed utilizing the same steps as described above for the isolated precipitate resolubilized by pH adjustment.

The optionally concentrated, optionally diafiltered, optionally heat treated, optionally polished, optional adsorbent treated aqueous soy protein solution then may be dried by any convenient technique, such as spray drying or freeze drying. The dry soy protein product has a protein content in excess of about 60 wt % protein, preferably at least about 90 wt %, more preferably about 100 wt % (N×6.25) d.b.

The soy protein products produced herein are soluble in an acidic aqueous environment, making the product ideal for incorporation into beverages, both carbonated and uncarbonated, to provide protein fortification thereto. Such beverages have a wide range of acidic pH values, ranging from about 2.5 to about 5. The soy protein products provided herein may be added to such beverages in any convenient quantity to provide protein fortification to such beverages, for example, at least about 5 g of the soy protein per serving. The added soy protein product dissolves in the beverage and does not impair the clarity of the beverage, even after thermal processing. The soy protein product may be blended with dried beverage prior to reconstitution of the beverage by dissolution in water. In some cases, modification of the normal formulation of the beverages to tolerate the composition of the invention may be necessary where components present in the beverage may adversely affect the ability of the composition to remain dissolved in the beverage.

EXAMPLES

Example 1

This Example illustrates the preparation of transparent, heat stable protein solutions utilizing extraction with calcium chloride solution at low pH.

Soy white flakes (10 g) were combined with 0.15M calcium chloride solution (100 ml) and the pH of the samples adjusted immediately to 4.8 and 1.5 with HCl. The samples were extracted at room temperature for 30 minutes using a magnetic stirrer. The pH of the samples was monitored and adjusted two times during the 30 minute extraction. The extract was separated from the spent meal by centrifugation at 10,200 g for 10 minutes and the centrates further clarified by filtration using 25 μm pore size filter paper. The clarity of the filtrates was measured using a HunterLab ColorQuest XE operated in transmission mode to supply a percentage haze reading. The samples were then diluted with one volume of reverse osmosis purified water and the haze level measured again. The pH of the diluted samples was then adjusted to 3 using either HCl or NaOH as necessary. The haze level of the pH adjusted samples was then analyzed. The samples were then heat treated to 95° C. for 30 seconds, immediately cooled to room temperature in ice water and the haze level re-assessed.

The haze values determined for the various samples are shown in Tables 1 and 2.

TABLE 1

Haze values for the treatment of samples from extraction with calcium chloride solution at pH 1.5

| sample | haze (%) |
| --- | --- |
| filtrate | 27.8 |
| diluted filtrate | 17.1 |
| diluted filtrate at pH 3 | 16.8 |
| diluted filtrate at pH 3 after heat treatment | 10.4 |

TABLE 2

Haze values for the treatment of samples from extraction with calcium chloride solution at pH 4.8

| sample | haze (%) |
| --- | --- |
| filtrate | 36.2 |
| diluted filtrate | 99.1 |
| diluted filtrate at pH 3 | 8.4 |
| diluted filtrate at pH 3 after heat treatment | 6.0 |

As may be seen from the results presented in Tables 1 and 2, the initial filtrates were somewhat hazy, however improved clarity may have been obtained by utilizing a finer filter. Dilution with one volume of water improved the clarity of the pH 1.5 sample but introduced precipitation in the pH 4.8 sample. Adjusting the pH of the diluted samples to 3 gave good clarity to the sample that was originally at pH 4.8, while the sample that was originally at pH 1.5 had perhaps a slight haze. After heat treatment both samples were considered clear.

Example 2

This Example illustrates the preparation of a soy protein isolate in accordance with one embodiment of the invention.

20 kg of defatted, minimally heat treated soy flour was added to 200 L of 0.15 M calcium chloride solution at ambient temperature and agitated for 30 minutes to provide an aqueous protein solution. Immediately after the flour was dispersed in the calcium chloride solution, the pH of the system was adjusted to 3 by the addition of diluted HCl. The pH was monitored and corrected to 3 periodically over the course of the 30 minute extraction. The residual soy flour was removed by centrifugation to yield 174 L of protein solution having a protein content of 3.37% by weight. The protein solution was then combined with 174 L of reverse osmosis purified water and the pH corrected to 3. This solution was then polished by filtration to yield 385 L of filtered protein solution having a protein content of 1.21% by weight.

The filtered protein solution was reduced in volume to 25 L by concentration on a PVDF membrane having a molecular weight cutoff of 5,000 Daltons. The concentrated protein solution was then diafiltered with 125 L of reverse osmosis purified water. The resulting diafiltered, concentrated protein solution had a protein content of 14.51% by weight and represented a yield of 81.3 wt % of the filtered protein solution. The diafiltered, concentrated protein solution was then dried to yield a product found to have a protein content of 99.18% (N×6.25) d.b. The product was termed S005-A13-09A S703.

Sufficient S005-A13-09A S703 to supply 0.48 g of protein was dissolved in 15 ml reverse osmosis purified water and the solution colour and clarity assessed using a HunterLab Color Quest XE instrument operated in transmission mode. The pH of the solution was measured with a pH meter.

The pH, colour and clarity values are set forth in the following Table 3:

TABLE 3 pH and HunterLab scores for solution of S005-A13-09A S703

| sample | pH | L* | a* | b* | haze (%) |
| --- | --- | --- | --- | --- | --- |
| S703 | 3.12 | 87.31 | 0.67 | 18.99 | 43.9 |

As may be seen from Table 3, the solution of S703 in water was semi-transparent, not transparent. The relatively high level of haze in this sample resulted in the L* value being somewhat lower than expected.

The colour of the dry powder was also assessed with the HunterLab Color Quest XE instrument in reflectance mode. The colour values are set forth in the following Table 4:

TABLE 4

HunterLab scores for S005-A13-09A S703 dry powder

| sample | L* | a* | b* |
| --- | --- | --- | --- |
| S703 | 85.67 | 0.05 | 10.57 |

As may be seen from Table 4, the dry product was very light in colour.

Example 3

This Example contains an evaluation of the heat stability in water of the soy protein isolate produced by the method of Example 2 (S703).

A solution of S005-A13-09A S703 was prepared by dissolving sufficient protein powder to supply 0.8 g protein in 40 ml RO water then the pH adjusted to 3. The clarity of this solution was assessed by haze measurement with the HunterLab Color Quest XE instrument. The solution was then heated to 95° C., held at this temperature for 30 seconds and then immediately cooled to room temperature in an ice bath. The clarity of the heat treated solution was then measured again.

The clarity of the protein solution before and after heating is set forth in the following Table 5:

TABLE 5

Effect of heat treatment on clarity of S005-A13-09A S703 solution

| sample | haze (%) |
|---|---|
| before heating | 43.6 |
| after heating | 30.7 |

As can be seen from the results in Table 5, it was found that the initial solution of S005-A13-09A S703 was quite hazy. However, the solution was heat stable, with the haze level actually reduced somewhat by the heat treatment.

Example 4

This Example contains an evaluation of the solubility in water of the soy protein isolate produced by the method of Example 2 (S703). Solubility was tested based on protein solubility (termed protein method, a modified version of the procedure of Morr et al., J. Food Sci. 50:1715-1718) and total product solubility (termed pellet method).

Sufficient protein powder to supply 0.5 g of protein was weighed into a beaker and then a small amount of reverse osmosis (RO) purified water was added and the mixture stirred until a smooth paste formed. Additional water was then added to bring the volume to approximately 45 ml. The contents of the beaker were then slowly stirred for 60 minutes using a magnetic stirrer. The pH was determined immediately after dispersing the protein and was adjusted to the appropriate level (2, 3, 4, 5, 6 or 7) with diluted NaOH or HCl. A sample was also prepared at natural pH. For the pH adjusted samples, the pH was measured and corrected two times during the 60 minutes stirring. After the 60 minutes of stirring, the samples were made up to 50 ml total volume with RO water, yielding a 1% w/v protein dispersion. The protein content of the dispersions was measured using a Leco FP528 Nitrogen Determinator. Aliquots (20 ml) of the dispersions were then transferred to pre-weighed centrifuge tubes that had been dried overnight in a 100° C. oven then cooled in a desiccator and the tubes capped. The samples were centrifuged at 7,800 g for 10 minutes, which sedimented insoluble material and yielded a clear supernatant. The protein content of the supernatant was measured by Leco analysis and then the supernatant and the tube lids were discarded and the pellet material dried overnight in an oven set at 100° C. The next morning the tubes were transferred to a desiccator and allowed to cool. The weight of dry pellet material was recorded. The dry weight of the initial protein powder was calculated by multiplying the weight of powder used by a factor of ((100−moisture content of the powder (%))/100). Solubility of the product was then calculated two different ways:

Solubility(protein method)(%)=(% protein in supernatant/% protein in initial dispersion)×100      1)

Solubility(pellet method)(%)=(1−(weight dry insoluble pellet material/((weight of 20 ml of dispersion/weight of 50 ml of dispersion)×initial weight dry protein powder)))×100      2)

The natural pH value of the protein isolate produced in Example 1 in water (1% protein) is shown in Table 6:

TABLE 6

Natural pH of S703 solution prepared in water at 1% protein

| Batch | Product | Natural pH |
|---|---|---|
| S005-A13-09A | S703 | 3.36 |

The solubility results obtained are set forth in the following Tables 7 and 8:

TABLE 7

Solubility of S703 at different pH values based on protein method

| | | Solubility (protein method) (%) | | | | | | |
|---|---|---|---|---|---|---|---|---|
| Batch | Product | pH 2 | pH 3 | pH 4 | pH 5 | pH 6 | pH 7 | Nat. pH |
| S005-A13-09A | S703 | 95.8 | 100 | 81.7 | 0.0 | 71.7 | 100 | 100 |

TABLE 8

Solubility of S703 at different pH values based on pellet method

| | | Solubility (pellet method) (%) | | | | | | |
|---|---|---|---|---|---|---|---|---|
| Batch | Product | pH 2 | pH 3 | pH 4 | pH 5 | pH 6 | pH 7 | Nat. pH |
| S005-A13-09A | S703 | 95.9 | 95.9 | 83.8 | 11.9 | 69.2 | 96.0 | 95.2 |

As can be seen from the results of Tables 7 and 8, the S703 product was highly soluble at pH values 2, 3 and 7 as well as at the natural pH. The solubility was slightly lower at pH 4.

Example 5

This Example contains an evaluation of the clarity in water of the soy protein isolate produced by the method of Example 2 (S703).

The clarity of the 1% w/v protein solutions prepared as described in Example 4 was assessed by measuring the absorbance at 600 nm, with a lower absorbance score indicating greater clarity. Analysis of the samples on a HunterLab ColorQuest XE instrument in transmission mode also provided a percentage haze reading, another measure of clarity.

The clarity results are set forth in the following Tables 9 and 10:

TABLE 9

Clarity of S703 solution at different pH values as assessed by A600

| | | A600 | | | | | | |
|---|---|---|---|---|---|---|---|---|
| Batch | Product | pH 2 | pH 3 | pH 4 | pH 5 | pH 6 | pH 7 | Nat. pH |
| S005-A13-09A | S703 | 0.098 | 0.152 | 1.381 | >3.0 | 1.876 | 0.155 | 0.192 |

TABLE 10

Clarity of S703 solution at different pH values as assessed by HunterLab analysis

| | | HunterLab haze reading (%) | | | | | | |
|---|---|---|---|---|---|---|---|---|
| Batch | Product | pH 2 | pH 3 | pH 4 | pH 5 | pH 6 | pH 7 | Nat. pH |
| S005-A13-09A | S703 | 12.0 | 20.8 | 86.3 | 91.6 | 90.0 | 19.7 | 29.8 |

As can be seen from the results of Tables 9 and 10, the solutions of S703 were clear to slightly hazy at pH 2-3. A slightly hazy solution was also obtained at pH 7.

Example 6

This Example contains an evaluation of the solubility in a soft drink (Sprite) and sports drink (Orange Gatorade) of the soy protein isolate produced by the method of Example 2 (S703). The solubility was determined with the protein added to the beverages with no pH correction and again with the pH of the protein fortified beverages adjusted to the level of the original beverages.

When the solubility was assessed with no pH correction, a sufficient amount of protein powder to supply 1 g of protein was weighed into a beaker and a small amount of beverage was added and stirred until a smooth paste formed. Additional beverage was added to bring the volume to 50 ml, and then the solutions were stirred slowly on a magnetic stirrer for 60 minutes to yield a 2% protein w/v dispersion. The protein content of the samples was analyzed using a Leco FP528 Nitrogen Determinator then an aliquot of the protein containing beverages was centrifuged at 7,800 g for 10 minutes and the protein content of the supernatant measured.

Solubility(%)=(% protein in supernatant/% protein in initial dispersion)×100

When the solubility was assessed with pH correction, the pH of the soft drink (Sprite) (3.39) and sports drink (Orange Gatorade) (3.19) without protein was measured. A sufficient amount of protein powder to supply 1 g of protein was weighed into a beaker and a small amount of beverage was added and stirred until a smooth paste formed. Additional beverage was added to bring the volume to approximately 45 ml, and then the solutions were stirred slowly on a magnetic stirrer for 60 minutes. The pH of the protein containing beverages was measured and then adjusted to the original no-protein pH with HCl or NaOH as necessary. The total volume of each solution was then brought to 50 ml with additional beverage, yielding a 2% protein w/v dispersion. The protein content of the samples was analyzed using a Leco FP528 Nitrogen Determinator then an aliquot of the protein containing beverages was centrifuged at 7,800 g for 10 minutes and the protein content of the supernatant measured.

Solubility(%)=(% protein in supernatant/% protein in initial dispersion)×100

The results obtained are set forth in the following Table 11:

TABLE 11

Solubility of S703 in Sprite and Orange Gatorade

| | | no pH correction | | pH correction | |
|---|---|---|---|---|---|
| Batch | Product | Solubility (%) in Sprite | Solubility (%) in Orange Gatorade | Solubility (%) in Sprite | Solubility (%) in Orange Gatorade |
| S005-A13-09A | S703 | 94.8 | 100 | 99.0 | 93.6 |

As can be seen from the results of Table 11, the S703 was highly soluble in the Sprite and the Orange Gatorade. As S703 is an acidified product, protein addition had little effect on beverage pH.

Example 7

This Example contains an evaluation of the clarity in a soft drink and sports drink of the soy protein isolate produced by the method of Example 2 (S703).

The clarity of the 2% w/v protein dispersions prepared in soft drink (Sprite) and sports drink (Orange Gatorade) in Example 6 were assessed using the methods described in Example 5. For the absorbance measurements at 600 nm, the spectrophotometer was blanked with the appropriate beverage before the measurement was performed.

The results obtained are set forth in the following Tables 12 and 13:

TABLE 12

Clarity (A600) of S703 in Sprite and Orange Gatorade

| | | no pH correction | | pH correction | |
|---|---|---|---|---|---|
| Batch | Product | A600 in Sprite | A600 in Orange Gatorade | A600 in Sprite | A600 in Orange Gatorade |
| S005-A13-09A | S703 | 0.460 | 0.404 | 0.471 | 0.539 |

TABLE 13

HunterLab haze readings for S703 in Sprite and Orange Gatorade

| | | no pH correction | | pH correction | |
|---|---|---|---|---|---|
| Batch | Product | haze (%) in Sprite | haze (%) in Orange Gatorade | haze (%) in Sprite | haze (%) in Orange Gatorade |
| no protein | | 0.0 | 44.0 | 0.0 | 44.0 |
| S005-A13-09A | S703 | 58.5 | 74.3 | 55.6 | 79.5 |

As can be seen from the results of Tables 12 and 13, the good solubility results obtained for the S703 in the Sprite and the Orange Gatorade did not translate to clarity in these beverages. In fact, the resulting solutions were quite hazy.

Example 8

This Example illustrates the preparation of soy protein isolates in accordance with other embodiments of the invention.

100 g of defatted soy white flake was added to 1000 ml of 0.15 M $CaCl_2$ solution at ambient temperature and agitated for 30 minutes to provide an aqueous protein solution.

Immediately after the flake was wetted with the calcium chloride solution, the pH of the system was adjusted to 4.5 with a solution of hydrochloric acid. The pH was monitored and corrected periodically throughout the 30 minute extraction. After the extraction step, the residual soy white flake was removed and the resulting protein solution was clarified by centrifugation and filtration to produce 578 ml of filtered protein solution having a protein content of 2.05% by weight.

530 ml of the protein extract solution was reduced to 45 ml on a polyethersulfone membrane having a molecular weight cutoff of 10,000 Daltons, producing a concentrated protein solution with a protein content of 19.40% by weight. The concentrated protein solution was then divided into two portions.

20 ml of the concentrated protein solution at 24° C. was diluted into 200 ml of reverse osmosis (RO) purified water having a temperature of 24° C. A white cloud formed and was allowed to settle. The sample then was centrifuged to separate the protein precipitate from the supernatant fraction. 5.72 g of wet protein precipitate was collected then resolublized in 20 ml of RO water with HCl solution added to reduce the pH to 2.99. The resolubilized protein precipitate, recovered in a yield of 23.8 wt % of the filtered protein solution, was freeze dried to provide a product given the designation S703-7300. The dried product was found to have a protein content of 101.75% (N×6.25) d.b.

Another 21 ml of the concentrated protein solution at 24° C. was diluted into 210 ml of RO water having a temperature of 24° C. The pH of the sample was then lowered from 4.76 to 2.98 with HCl solution. 220 ml of the acidified solution was reduced in volume to 33 ml on a polyethersulfone membrane having a molecular weight cutoff of 10,000 Daltons, producing a concentrated protein solution with a protein content of 9.76% by weight. This concentrated protein solution, recovered in a yield of 30.1 wt % of the filtered protein solution, was freeze dried to provide a product given the designation S703-7301. The dried product was found to have a protein content of 92.21% (N×6.25) d.b.

Solutions of S703-7300 and S703-7301 were prepared by dissolving sufficient powder to supply 0.48 g protein in 15 ml of RO water. The colour and clarity of the solutions were assessed using a HunterLab ColorQuest XE operated in transmission mode. The pH of the solutions was measured with a pH meter.

The pH, colour and clarity values are set forth in the following Table 14.

TABLE 14 pH and HunterLab scores for S703-7300 and S703-7301 solutions

| sample | pH | L* | a* | b* | haze (%) |
|---|---|---|---|---|---|
| S703-7300 | 2.83 | 88.67 | 0.71 | 15.57 | 38.9 |
| S703-7301 | 3.10 | 88.71 | 0.80 | 14.84 | 30.8 |

As may be seen from the results presented in Table 14, the solutions of S703-7300 and S703-7301 were translucent and light in colour.

Example 9

This Example illustrates the generation of a protein precipitate upon dilution of concentrated protein solutions prepared at low pH then adjusted in pH prior to the dilution step.

100 g of defatted soy white flake was added to 1000 ml of 0.15 M $CaCl_2$ solution at ambient temperature and agitated for 30 minutes to provide an aqueous protein solution. Immediately after the flake was wetted with the calcium chloride solution, the pH of the system was adjusted to 3.0 with a solution of hydrochloric acid. The pH was monitored and corrected periodically throughout the 30 minute extraction. After the extraction step, the residual soy white flake was removed and the resulting protein solution was clarified by centrifugation and filtration to produce 568 ml of filtered protein solution having a protein content of 2.78% by weight.

550 ml of the protein extract solution was reduced to 84 ml on a polyethersulfone membrane having a molecular weight cutoff of 10,000 Daltons, producing a concentrated protein solution with a protein content of 15.18% by weight.

The ultrafiltration retentate, having a pH of 3.11 was divided into aliquots and the pH adjusted with 6M NaOH and 0.5M HCl as necessary to approximately 4, 5, 6 or 7. The protein content of the pH adjusted retentate samples was measured. Aliquots of the pH adjusted retentate samples were clarified by centrifugation at 7,800 g for 10 minutes then the protein content of the centrates determined. Additional aliquots of the pH adjusted retentate samples were diluted with 10 volumes of RO water, mixed with a vortex and the pH, conductivity, A600 and protein content of the diluted samples determined. The diluted samples were clarified by centrifugation at 7,800 g for 10 minutes then the protein content of the centrate was determined.

Raising the pH of the retentate caused all the samples to become cloudier, regardless of the final pH. Determination of the protein content before and after clarification indicated that about 20% of the protein in the sample was precipitated by the pH adjustment. (Table 15).

TABLE 15

Protein content of pH adjusted retentate samples before and after clarification

| Retentate adjusted to pH | A600 before clarification | % w/w protein before clarification | % w/w protein after clarification | % of protein precipitated by pH adjustment |
|---|---|---|---|---|
| 3.11 | 0.437 | 15.18 | 15.54 | 0.00 |
| 4.00 | 2.667 | 15.13 | 12.06 | 20.3 |
| 5.01 | 2.879 | 14.94 | 11.75 | 21.4 |
| 6.04 | 2.877 | 15.02 | 11.99 | 20.2 |
| 7.00 | 2.889 | 14.91 | 12.03 | 19.3 |

Dilution of the pH adjusted retentate samples resulted in samples that were very cloudy, particularly when the retentate was at pH 4 and higher (Table 16). Analysis of the protein concentration of the samples, before and after clarification indicated that some protein was precipitated at all pH values, but particularly when the retentate pH was 4 or greater before the dilution step. The high degree of protein precipitation in the pH 4-7 samples indicates that the dilution step is introducing protein precipitation beyond that induced by the pH adjustment.

TABLE 16

Properties of pH adjusted (no clarification) retentate samples after dilution

| Retentate adjusted to pH | pH | Cond (mS) | A600 | % w/w protein (no clarification) | % w/w protein after clarification | % of protein precipitated by dilution |
|---|---|---|---|---|---|---|
| 3.11 | 3.34 | 3.27 | 1.625 | 1.33 | 0.89 | 33.1 |
| 4.00 | 4.36 | 3.02 | 2.601 | 1.01 | 0.08 | 92.1 |
| 5.01 | 5.25 | 2.82 | 2.425 | 0.96 | 0.02 | 97.9 |
| 6.04 | 6.24 | 2.96 | 2.574 | 0.99 | 0.12 | 87.9 |
| 7.00 | 7.03 | 2.90 | 2.706 | 1.13 | 0.13 | 88.5 |

SUMMARY OF THE DISCLOSURE

In summary of this disclosure, the present invention provides a method of producing a soy protein isolate which is soluble in acid media, based on extraction of a soy protein source material using aqueous calcium chloride solution at low pH. Modifications are possible within the scope of this invention.

What we claim is:

1. A method of producing a soy protein product having a soy protein content of at least about 60 wt % (N×6.25) on a dry weight basis, which comprises:
   (a) extracting a soy protein source with an aqueous calcium salt solution at a pH of about 1.5 to about 5 to cause solubilization of soy protein from the soy protein source and to form an aqueous soy protein solution,
   (b) at least partially separating the aqueous soy protein solution from residual soy protein source, and
   (c) following said separation step, diluting said aqueous soy protein solution to a conductivity of less than about 90 mS.

2. The process of claim 1 wherein said extraction step is effected using an aqueous calcium chloride solution having a concentration of less than about 1.0 M.

3. The process of claim 2 wherein said aqueous calcium chloride solution has a concentration of about 0.10 to about 0.15 M.

4. The process of claim 1 wherein said extraction step is effected at a temperature of about 15° to about 35° C.

5. The process of claim 1 wherein said aqueous soy protein solution has a protein concentration of about 5 to about 50 g/L.

6. The process of claim 5 wherein said protein concentration is about 10 to about 50 g/L.

7. The process of claim 1 wherein said aqueous calcium salt solution contains an antioxidant.

8. The process of claim 1 wherein, following said separation step, the separated aqueous soy protein solution is treated with an adsorbent to remove colour and/or odour compounds from the separated aqueous soy protein solution, prior to the dilution step.

9. The process of claim 1 wherein following said dilution step, the pH of the aqueous protein solution, is adjusted to a different value within the range of about 1.5 to about 5.0.

10. The process of claim 9 wherein the pH value is adjusted to about 1.5 to about 4.4.

11. The process of claim 10 wherein the pH value is adjusted to about 2.0 to 4.0.

12. The process of claim 1 wherein said aqueous soy protein solution is diluted with about 0.5 to about 10 volumes of aqueous diluent such as water or dilute salt solution to provide a conductivity of said soy protein solution of about 4 to about 31 mS.

13. The process of claim 1 wherein said diluent has a temperature of about 2° C. to about 70° C.

14. The process of claim 13 wherein said temperature is about 15° to about 65° C.

15. The process of claim 14 wherein said temperature is about 20° to about 35° C.

16. The process of claim 9 wherein said soy protein solution, following the dilution and pH adjustment steps has a conductivity of less than about 95 mS.

17. The process of claim 16 wherein said conductivity is about 4 to about 36 mS.

18. The process of claim 1, wherein said aqueous protein solution is subjected to a heat treatment step to inactivate heat-labile anti-nutritional factors.

19. The process of claim 18 wherein the anti-nutritional factors are heat-labile trypsin inhibitors.

20. The process of claim 18 wherein the heat treatment step also pasteurizes the aqueous soy protein solution.

21. The process of claim 18, wherein said heat treatment is effected at a temperature of about 70° to about 160° C. for about 10 seconds to about 60 minutes.

22. The process of claim 21 wherein said heat treatment is effected at a temperature of about 80° to about 120° C. for about 10 seconds to about 5 minutes.

23. The process of claim 22 wherein said heat treatment is effected at a temperature of about 85° C. to about 95° C. for about 30 seconds to about 5 minutes.

24. The process of claim 18 wherein the heat treated soy protein solution is cooled to a temperature of about 2° to about 65° C. for further processing.

25. The process of claim 24 wherein the heat treated soy protein solution is cooled to a temperature of about 20° to about 35° C. for further processing.

26. The process of claim 1 wherein the diluted soy protein solution is dried to provide a soy protein product having a soy protein content of at least about 60 wt % (N×6.25) d.b.

27. The process of claim 1 wherein the diluted soy protein solution is concentrated while maintaining the ionic strength thereof substantially constant to produce a concentrated soy protein solution having a protein concentration of about 50 to about 300 g/L and the concentrated soy protein solution is optionally diafiltered.

28. The process of claim 27 wherein said concentrated soy protein solution has a protein concentration of about 100 to about 200 g/L.

29. The process of claim 27 wherein said concentration step is effected by ultrafiltration using a membrane having a molecular weight cut-off of about 3,000 to about 1,000,000 Daltons.

30. The process of claim 29 wherein said membrane has a molecular weight cut-off of about 5,000 to about 100,000 Daltons.

31. The process of claim 27 wherein a diafiltration step is effected using water, dilute saline, acidified water or acidified dilute saline on the soy protein solution before or after partial or complete concentration thereof.

32. The process of claim 31 wherein said diafiltration is effected using about 2 to about 40 volumes of diafiltration solution.

33. The process of claim 32 wherein said diafiltration is effected using about 5 to about 25 volumes of diafiltration solution.

34. The process of claim 31 wherein said diafiltration is effected until no significant further quantities of contaminants or visible colour are present in the permeate.

35. The process of claim 31 wherein said diafiltration is effected until the retentate has been sufficiently purified so as, when dried, to provide a soy protein isolate with a protein content of at least about 90 wt % (N×6.25) d.b.

36. The process of claim 31 wherein said diafiltration is effected using a membrane having a molecular weight cut-off of about 3,000 to about 1,000,000 Daltons.

37. The process of claim 36 wherein said membrane has a molecular weight cut-off of about 5,000 to about 100,000 Daltons.

38. The process of claim 31 wherein an antioxidant is present in the diafiltration medium during at least part of the diafiltration step.

39. The process of claim 27 wherein said concentration step and optional diafiltration step are carried out at a temperature of about 2° to about 65° C.

40. The process of claim 39 wherein said temperature is about 20° to about 35° C.

41. The process of claim 27 wherein the concentrated and optionally diafiltered soy protein solution is subjected to a heat treatment step to inactivate heat-labile anti-nutritional factors, including heat-labile trypsin inhibitors.

42. The process of claim 41 wherein said heat treatment is effected at a temperature of about 70° to about 160° C. for about 10 seconds to 60 minutes.

43. The process of claim 42 wherein the heat treated soy protein solution is cooled to a temperature of about 2° to about 65° C. for further processing.

44. The process of claim 1 wherein said soy protein solution is concentrated and diafiltered to produce a concentrated and diafiltered soy protein solution which, when dried, provides a soy protein product having a protein concentration of at least about 60 wt % (N×6.25) d.b.

45. The process of claim 27 wherein said concentrated and optionally diafiltered soy protein solution is treated with an adsorbent to remove colour and/or odour compounds.

46. The process of claim 27 wherein said concentrated and optionally diafiltered soy protein solution is pasteurized prior to drying.

47. The process of claim 46 wherein said pasteurization step is effected at a temperature of about 55° to about 70° C. for about 30 seconds to about 60 minutes.

48. The process of claim 47 wherein said pasteurization step is effected at a temperature of about 60° to about 65° C. for about 10 to about 15 minutes.

49. The process of claim 35 wherein said concentrated and optionally diafiltered soy protein solution is dried to provide a soy protein isolate having a protein content of at least about 90 wt % (N×6.25) d.b.

50. The process of claim 49 wherein said soy protein isolate has a protein content of at least about 100 wt % (N×6.25) d.b.

51. The process of claim 27 wherein the concentration and/or optional diafiltration step are operated in a manner favourable to the removal of trypsin inhibitors.

52. The process of claim 1 wherein a reducing agent is present during the extraction step to disrupt or rearrange the disulfide bonds of trypsin inhibitors to achieve a reduction in trypsin inhibitor activity.

53. The process of claim 27 wherein a reducing agent is present during the concentration step and/or optional diafiltration step to disrupt or rearrange the disulfide bonds of trypsin inhibitors to achieve a reduction in trypsin inhibitor activity.

54. The process of claim 44 wherein a reducing agent is added to the concentrated and optionally diafiltered soy protein solution prior to drying and/or the dried soy protein product to disrupt or rearrange the disulfide bonds of trypsin inhibitors to achieve a reduction in trypsin inhibitor activity.

55. The process of claim 27 wherein the concentrated and optionally diafiltered soy protein solution is diluted to form a precipitate, the precipitate is separated from the supernatant thereto, and the separated precipitate is dried or solubilized in water at low pH to form a protein solution.

56. The process of claim 55 wherein the dilution is effected about 5 to about 25 fold with water.

57. The process of claim 56 wherein the water used to effect the dilution has a temperature of about 1° to about 65° C.

58. The process of claim 55 wherein the precipitate is washed with about 1 to about 10 volumes of water and then the precipitate is recovered.

59. The process of claim 55 wherein the precipitate is dried to form a soy protein product having a protein content of at least about 60 wt % (N×6.25) d.b.

60. The process of claim 55 wherein the precipitate is solubilized in water at a pH of about 1.5 to about 4.4 to form a soy protein solution, which may be dried.

61. The process of claim 60 wherein the protein solution is dried to form a soy protein product having a protein content of at least about 60 wt % (N×6.25) d.b.

62. The process of claim 60 wherein the soy protein solution is subjected to a heat treatment step to inactivate heat labile anti-nutritional factors.

63. The process of claim 60 wherein the soy protein solution is concentrated to increase the concentration thereof while maintaining the ionic strength substantially constant by using a selective membrane technique and optionally diafiltered.

64. The process of claim 63 wherein the concentrated and optionally diafiltered soy protein solution is treated with an adsorbent to remove colour and/or odour compounds.

65. The process of claim 63 wherein the concentrated and optionally diafiltered soy protein solution is dried to form a soy protein product having a protein content of at least about 60 wt % (N×6.25) d.b.

66. The process of claim 56 wherein the dilution is effected with about 10 to about 20 fold with water.

67. The process of claim 57 wherein the water used to effect the dilution.

68. The process of claim 58 wherein the precipitate is washed with about 2 to about 3 volumes of water.

69. The process of claim 59, wherein the soy protein product has a protein content of at least about 90 wt % (N×6.25) d.b.

70. The process of claim 69, wherein the soy protein product has a protein content of at least about 100 wt % (N×6.25) d.b.

71. The process of claim 60, wherein the precipitate is solubilized in about 2 to about 3 volumes of water at a pH of about 2.0 to about 4.0.

72. The process of claim 61 wherein the soy protein product has a protein content of at least about 90 wt % (N×0.6.25) d.b.

73. The process of claim 72 wherein the soy protein product has a protein content of at least about 100 wt % (N×0.6.25) d.b.

74. The process of claim 65 wherein the soy protein product has a protein content of at least about 90 wt % (N×0.6.25) d.b.

75. The process of claim 74 wherein the soy protein product has a protein content of at least about 100 wt % (N×0.6.25) d.b.

76. A process of producing a soy protein product having a soy protein content of at least about 60 wt % (N×6.25) on a dry weight basis, which comprises:
  (a) extracting a soy protein source with an aqueous calcium salt solution at a pH of about 1.5 to about 5 to cause solubilization of soy protein from the soy protein source and to form an aqueous soy protein solution,
  (b) at least partially separating the aqueous soy protein solution from residual soy protein source,
  (c) concentrating said soy protein solution while maintaining the ionic strength thereof substantially constant to produce a concentrated soy protein solution having a protein concentration of about 50 to about 70 g/L and the concentrated soy protein solution is optionally diafiltered,
  (d) diluting the concentrated and optionally diafiltered soy protein solution to form a precipitate, separating the precipitate from the supernatant thereto and either drying the separated precipitate or solubilizing the separated precipitate in water at low pH to form a protein solution, and
  (e) pH adjusting the concentrated and optionally diafiltered soy protein solution prior to the dilution step to a pH of about 1.5 to about 7.0.

77. The process of claim 76 wherein the pH in step (e) is about 4.0 to about 7.0.

78. The process of claim 77 wherein the pH in step (e) is 5.0 to 7.0.

79. A process of producing a soy protein product having a soy protein content of at least about 60 wt % (N×6.25) on a dry weight basis, which comprises:
  (a) extracting a soy protein source with an aqueous calcium salt solution at a pH of about 1.5 to about 5 to cause solubilization of soy protein from the soy protein source and to form an aqueous soy protein solution,
  (b) at least partially separating the aqueous soy protein solution from residual soy protein source,
  (c) concentrating said soy protein solution while maintaining the ionic strength thereof substantially constant to produce a concentrated soy protein solution having a protein concentration of about 50 to about 70 g/L and the concentrated soy protein solution is optionally diafiltered, and
  (d) diluting the concentrated and optionally diafiltered soy protein solution to form a precipitate which is re-solubilized in the dilution water by pH adjustment to form a soy protein solution.

80. The process of claim 79 wherein the concentrated and optionally diafiltered soy protein solution is pH-adjusted prior to the dilution step to a pH of about 1.5 to about 7.0.

81. The process of claim 80 wherein the pH is about 4.0 to about 7.0.

82. The process of claim 79 wherein the precipitate is re-solubilized in the dilution water by pH adjustment of the mixture subsequent to the dilution step to a pH of about 1.5 to about 4.4.

83. The process of claim 82 wherein the pH is about 2.0 to about 4.0.

84. The process of claim 79 wherein the dilution is effected about 1 to about 25 fold with water.

85. The process of claim 84 wherein the water used to effect the dilution has a temperature of about 1 to about 65° C.

86. The process of claim 79 wherein the soy protein solution is dried to form a soy protein product having a protein content of at least about 60 wt % (N×6.25) d.b.

87. The process of claim 79 wherein the soy protein solution formed in step (d) is subjected to a heat treatment step to inactivate heat labile anti-nutritional factors.

88. The process of claim 79 wherein the soy protein solution is concentrated to increase the concentration thereof while maintaining the ionic strength substantially constant by using a selective membrane technique, and optionally diafiltered.

89. The process of claim 88 wherein the concentrated and optionally diafiltered soy protein solution is treated with an adsorbent to remove colour and/or odour compounds.

90. The process of claim 81 wherein the pH is 5.0 to 7.0.

91. The process of claim 82 wherein the temperature is about 20° to about 35° C.

92. The process of claim 86 wherein the soy protein product is a soy protein solution having a protein content of at least about 90 wt % (N×6.25) d.b.

93. The process of claim 92 wherein the soy protein isolate has a protein content of at least about 100 wt % (N×6.25) d.b.

94. The process of claim 84 wherein the dilution is effected about 3 to about 12 fold with water.

* * * * *